R. AMES.
WAGON JACK.
APPLICATION FILED SEPT. 3, 1915.

1,176,512.

Patented Mar. 21, 1916.
2 SHEETS—SHEET 1.

WITNESSES

INVENTOR
Rufus Ames
BY
ATTORNEYS

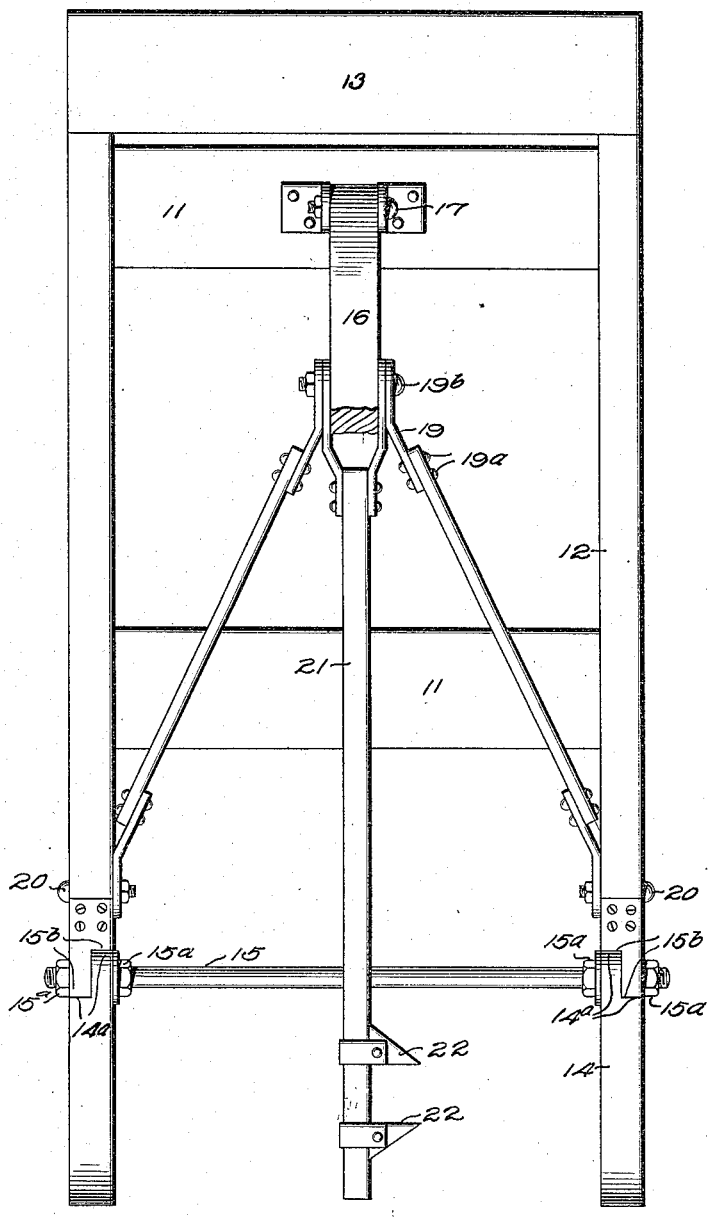

UNITED STATES PATENT OFFICE.

RUFUS AMES, OF SPOKANE, WASHINGTON.

WAGON-JACK.

1,176,512.

Specification of Letters Patent.

Patented Mar. 21, 1916.

Application filed September 3, 1915. Serial No. 48,799.

*To all whom it may concern:*

Be it known that I, RUFUS AMES, a citizen of the United States, and a resident of Spokane, in the county of Spokane and State of Washington, have invented a new and Improved Wagon-Jack, of which the following is a full, clear, and exact description.

A prime object of my invention is to provide a wagon jack having means to engage a vehicle wheel in a manner to lift the wheel and axle and to give a sliding movement to the wheel relatively to the axle to remove the wheel or restore the same to its position on the axle.

The invention also has for its object to provide a jack improved in various particulars, with respect to strength and efficiency and with a view to promote convenience and simplicity of construction and operation.

Figure 1:
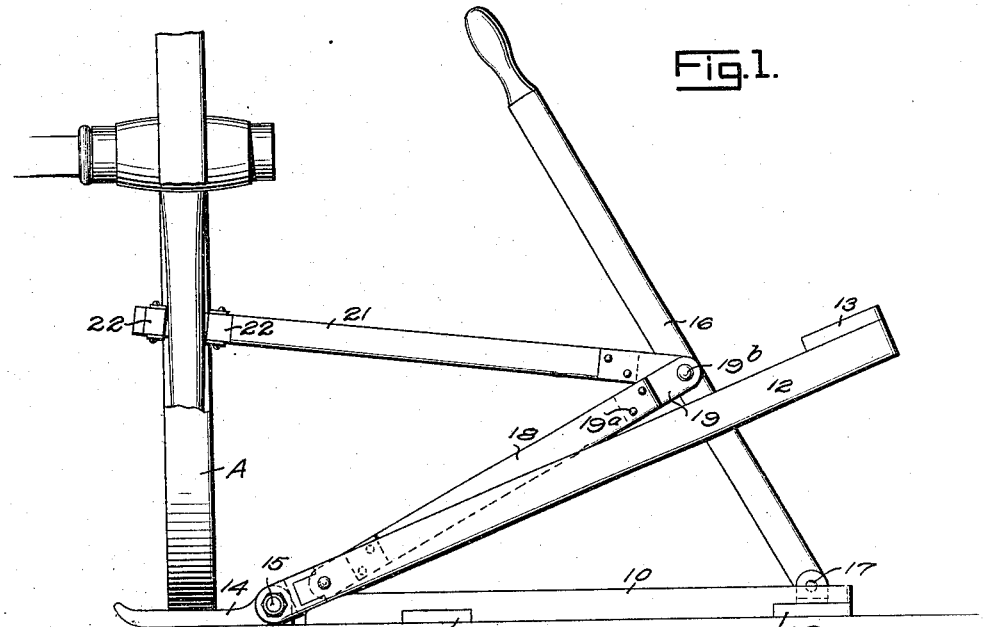
Figure 2:
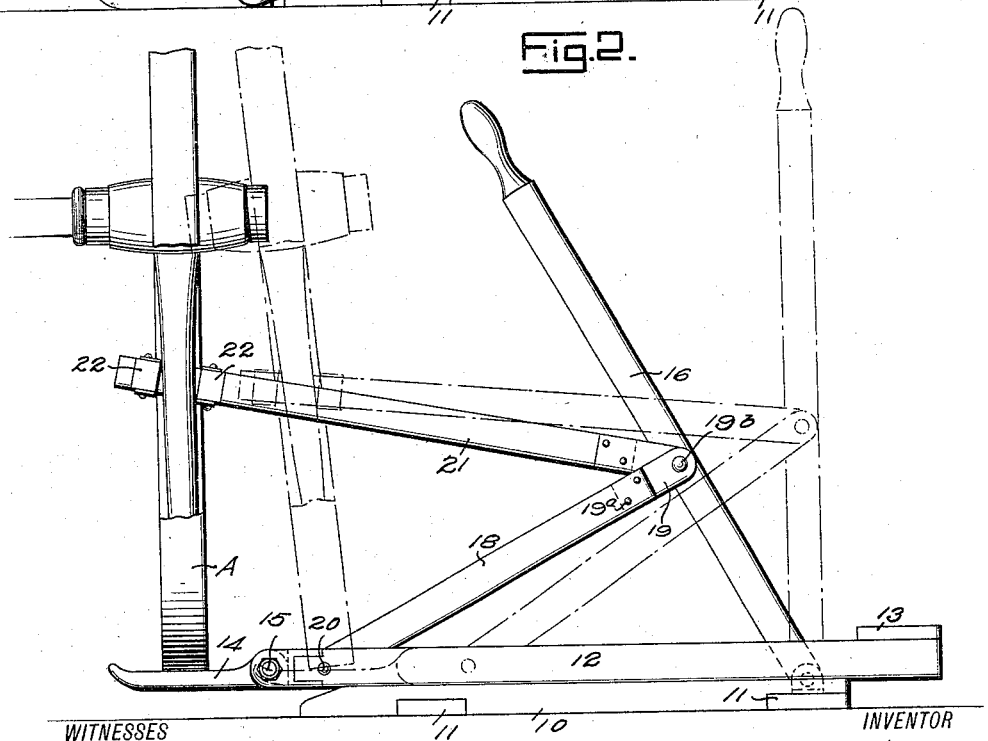

Reference is had to the accompanying drawings forming part of this specification, in which similar characters of reference indicate corresponding parts in all the views, and in which:

Figure 1 is a side elevation of a jack embodying my invention, showing the same in position ready for lifting and moving a wheel; Fig. 2 is a similar view showing the parts in position after lifting the wheel ready for sliding the same from the axle, the dotted lines indicating the positions of the parts when the wheel has been removed from the axle; and Fig. 3 is a plan view on an enlarged scale, a portion of the hand lever forming part of the jack being broken away.

In constructing a jack in accordance with my invention, a suitable base 10 is provided, which may consist of side bars united by cross bars 11. Above the base 10 is a foot lever 12 which may consist of side bars united by a cross bar or tread 13 at the rear end thereof. The foot lever 12 is provided at the front end with a forwardly extending wheel seat 14 adapted to be positioned beneath a wheel A by a proper forward movement of the said foot lever. As seen best in Fig. 3, the foot rest consists of two separate members which respectively are pivotally mounted on the side bars of the foot lever 12 by a transverse bolt 15 having clamp nuts 15ª at the opposite sides of said side bars. On the opposed rabbeted ends of the wheel seat members 14 and the foot lever 12, shoulders 14ª, 15ᵇ are formed to limit the relative movement of the members 14, so that a lifting movement of the foot lever 12 will also lift the members 14, but the foot lever will be free to be moved upwardly relatively to the said members.

A hand lever 16 is fulcrumed at its lower end as at 17 on the base 10 to have to and fro movement in the vertical plane. Links 18 suspend the foot lever 12 from the hand lever 16. The said links 18 are connected with the hand lever by metallic straps 19 which are secured to the links 18 by bolts 19ª, or the like, and are pivoted to the lever 16 by a bolt 19ᵇ. On the lower end of the links 18 the foot lever 12 is pivoted at its forward end as at 20. Connected with the hand lever 16 I provide also a wheel grip to engage the wheel A above the wheel seat members 14. The said wheel grip consists of a bar 21 pivoted at its rear end on the hand lever 16 preferably by means of the bolt 19ᵇ that connects the links 18. At the forward end the bar 21 is provided with laterally projecting grip members 22 spaced apart a sufficient distance to pass at opposite sides of a spoke of the wheel A.

With the described construction, when it is desired to remove the wheel A, the jack is placed adjacent to the wheel at the outside, as shown, and the hand lever 16 is thrown forwardly. The forward movement of the hand lever will carry forward the foot lever 12 and position the wheel seat members 14 beneath the wheel. At the same time the grip bar 21 will be projected through the spokes and may readily be positioned by a proper relative movement of the grip bar or wheel for the grip members 22 to engage one of the spokes. The forward movement of the foot lever and its seat members 14 will be partly accomplished by pressing the same forwardly while moving the hand lever, the foot lever for these movements being rockable on the pivots 15 and 20, the links 18 in the meantime readily accommodating themselves to the forward swinging movement of the foot lever. With the seat members 14 positioned beneath the wheel and the foot lever 20 resting on the forward end of the base as a fulcrum, the downward rocking of the foot lever 12 will serve to raise the wheel as shown in Fig. 2, and a rearward throw of the hand lever 16 will then carry rearwardly both the foot lever and the wheel grip 21, so that the wheel A will be carried from the axle to the position indicated by dotted lines in Fig. 2.

Having thus described my invention, what I claim as new and desire to secure by Letters Patent, is:

1. A jack comprising a lever having a wheel seat adapted to be positioned beneath a wheel, and movable on its fulcrum to raise or lower the wheel seat, a wheel grip above the wheel seat, and carrying and actuating means for said lever and wheel grip, said means being movable to bodily carry said lever and wheel grip forward and back.

2. A jack including a base, a hand lever fulcrumed on said base to rock forward and back in a vertical plane, a foot-lever fulcrumed to rock in a vertical plane, means connected with the first lever and movable therewith and on which means said second lever is hung to be carried bodily forward and back independently of the base, the foot-lever being fulcrumed to vibrate independently of the bodily movement thereof by the hand-lever, and a wheel rest on the forward end of the foot-lever.

3. A jack comprising a base, a foot-lever movable bodily to and fro relative to the base, and having a wheel seat at its forward end adapted to be positioned beneath a wheel, a hand lever fulcrumed on the base, means forming a connection between the foot lever and hand lever to shift the foot lever back and forth by a movement of the hand lever, and a wheel grip extending forwardly from the hand lever above the wheel seat, the said foot-lever and wheel grip being adapted to move bodily in unison back and forth by the movements of the hand-lever and the foot-lever being rockable on the front end of the base as a fulcrum independently of the hand-lever to raise and lower the wheel rest.

4. A jack comprising a base, a foot lever movable bodily to and fro relative to the base, and having a wheel seat at its forward end adapted to be positioned beneath a wheel, a hand lever fulcrumed on the base, means forming a connection between the foot lever and hand lever to shift the foot lever back and forth by a movement of the hand lever, and a wheel grip extending forwardly from the hand lever above the wheel seat and pivotally connected with the said hand lever, the said foot-lever and wheel grip being adapted to move bodily in unison back and forth by the movements of the hand-lever and the foot-lever being rockable on the front end of the base as a fulcrum independently of the hand-lever to raise and lower the wheel rest.

5. A jack comprising a base, a hand lever fulcrumed on the base for to and fro movement, a foot lever, means suspending the foot lever on the hand lever for bodily movement to and fro independent of the base, on which means the foot lever is pivoted and is adapted to rock independently of the hand-lever, a wheel seat pivoted on the foot lever at the front end, there being opposed stop surfaces on the foot lever and wheel seat to limit the downward movement of the foot lever, and cause the wheel seat to be lifted by the lifting of the lever.

6. A jack comprising a base, a hand lever fulcrumed on the base for to and fro movement, a foot lever, means suspending the foot lever on the hand lever for bodily movement to and fro, on which means the foot lever is pivoted for up and down rocking movement, said foot lever being adapted to rest on the base as a fulcrum, a wheel seat pivoted on the foot lever at the front end, there being opposed stop surfaces on the foot lever and wheel seat to limit the downward movement of the foot lever relatively to the said seat and cause the latter to be lifted by the lever, and a wheel grip pivoted to the hand lever above the said wheel seat.

7. A jack comprising a base, a hand lever fulcrumed at its lower end on the base for to and fro movement, a foot lever above the base, links pivotally connected with the hand lever and diverging therefrom in a downward direction, the said foot lever being pivoted on the lower forward ends of said links and adapted to rest at its forward end on the said base as a fulcrum, a wheel rest pivotally mounted on the front end of the foot lever to have limited movement relatively thereto, and a wheel grip pivotally connected at its rear end with the said hand lever forwardly therefrom above the wheel seat, the forward end of the said grip member having lateral gripping elements to engage the spoke of a wheel.

In testimony whereof I have subscribed my name to this specification in the presence of two subscribing witnesses.

RUFUS AMES.

Witnesses:
JOHN PATTISON,
GRETA PATTISON.

Copies of this patent may be obtained for five cents each, by addressing the "Commissioner of Patents, Washington, D. C."